(12) United States Patent
Lerner

(10) Patent No.: US 6,938,793 B2
(45) Date of Patent: Sep. 6, 2005

(54) THERMAL PRESERVATION INSERT FOR FOOD STORAGE CONTAINER

(76) Inventor: William S. Lerner, 215 E. 68th St., Apt. 23A, New York, NY (US) 10021-5729

(*) Notice: Subject to any disclaimer, the term of this patent is extended or adjusted under 35 U.S.C. 154(b) by 0 days.

(21) Appl. No.: 10/022,930

(22) Filed: Dec. 18, 2001

(65) Prior Publication Data

US 2003/0111472 A1 Jun. 19, 2003

(51) Int. Cl.[7] .............................................. B65D 23/02
(52) U.S. Cl. .................................................... 220/574.2
(58) Field of Search ....................... 220/574.2, 592.16, 220/592.17, 592.22, 903, 592.23; 62/530, 372, 457.9

(56) References Cited

U.S. PATENT DOCUMENTS

| | | | | |
|---|---|---|---|---|
| 2,989,856 A | * | 6/1961 | Telkes | 62/371 |
| 3,255,607 A | * | 6/1966 | Bair et al. | 62/372 |
| 3,406,532 A | | 10/1968 | Rownd et al. | 62/457 |
| 3,429,141 A | | 2/1969 | Halseth | 62/322 |
| 3,830,676 A | | 8/1974 | Elkins | 156/289 |
| 4,065,336 A | * | 12/1977 | Conklin | 156/69 |
| 4,197,890 A | * | 4/1980 | Simko | 383/97 |
| 4,323,167 A | * | 4/1982 | Zirn et al. | 220/592.23 X |
| 4,383,422 A | * | 5/1983 | Gordon et al. | 220/903 X |
| 4,446,705 A | * | 5/1984 | Loucks | 62/372 |
| 4,523,433 A | | 6/1985 | Takahashi | 62/60 |
| 4,527,703 A | * | 7/1985 | Cummings | 215/232 |
| 4,577,474 A | * | 3/1986 | Peterson | 62/457.4 |
| 4,630,671 A | * | 12/1986 | Sherman et al. | 220/574.2 X |
| 4,656,840 A | * | 4/1987 | Loofbourrow et al. | 62/530 |
| 4,745,776 A | * | 5/1988 | Clark | 62/457.4 |
| 5,076,463 A | * | 12/1991 | McGraw | 220/592.17 |
| 5,212,963 A | * | 5/1993 | McGinnis | 62/457.4 |
| 5,390,797 A | | 2/1995 | Smalley et al. | 206/252 |
| 5,701,757 A | | 12/1997 | Heverly | 62/457.2 |
| 6,141,969 A | * | 11/2000 | Launchbury et al. | 220/903 X |
| 6,145,685 A | * | 11/2000 | Dick | 220/592.23 X |

* cited by examiner

Primary Examiner—Stephen Castellano
(74) Attorney, Agent, or Firm—Steven Horowitz

(57) ABSTRACT

A freezer insert, a warmer insert or a freezer/warmer insert designed for use inside plastic food containers conforms to the bottom of the various sizes and shapes of the most popular plastic food containers sold under brand names such as Ziplock, Glad, Tupperware. The insert is a flat disk and contains known gels or thermal preservation fluids useful for portable cooling or warming. The insert also can rest on the walls of the container if those walls slope outward in the direction of the opening. The inserts divide the container vertically into cool, extra cool or hot compartments for different types of food. The disk can be round, square or of other shape. The inserts are stackable to allow efficient storage, for example in a freezer or kitchen cabinet.

7 Claims, 5 Drawing Sheets

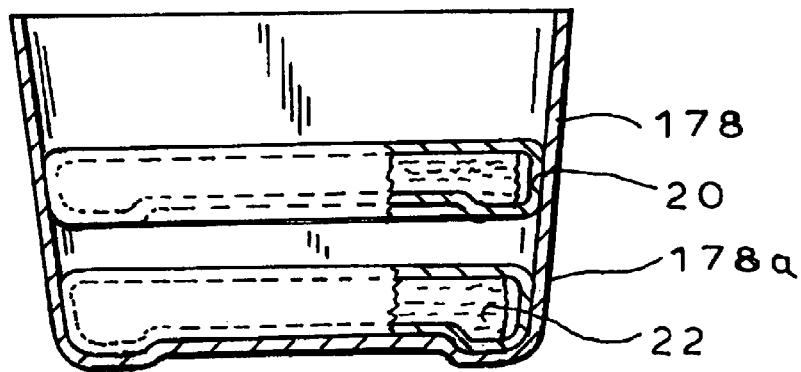
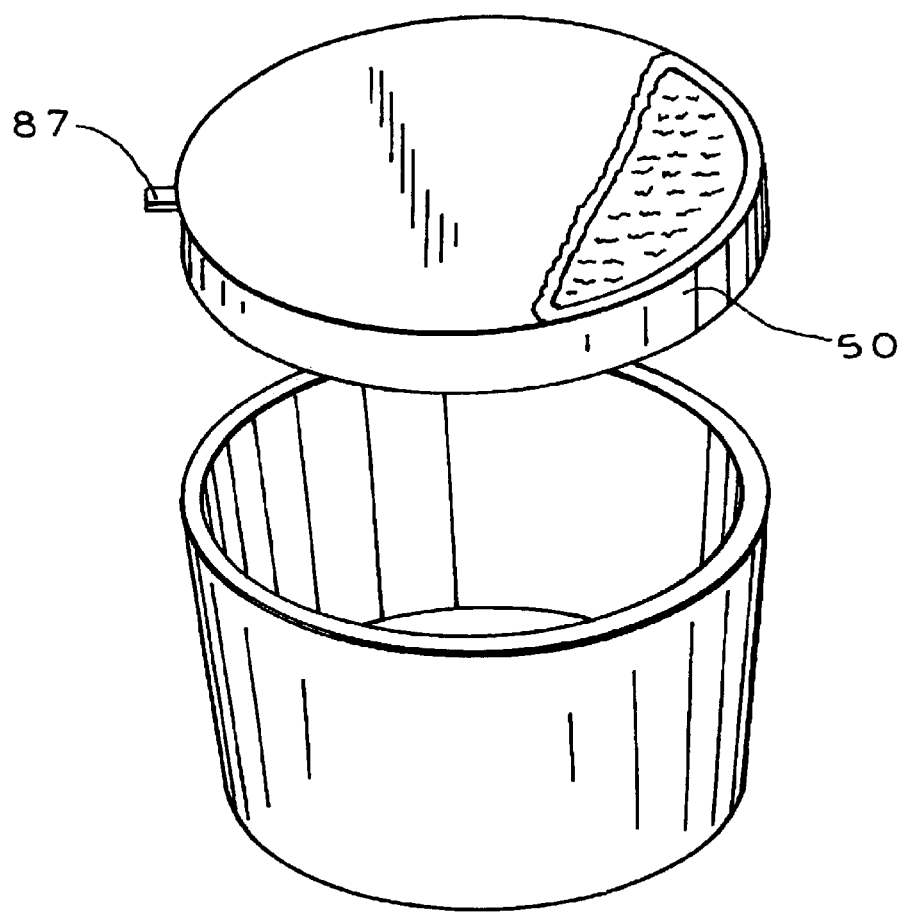

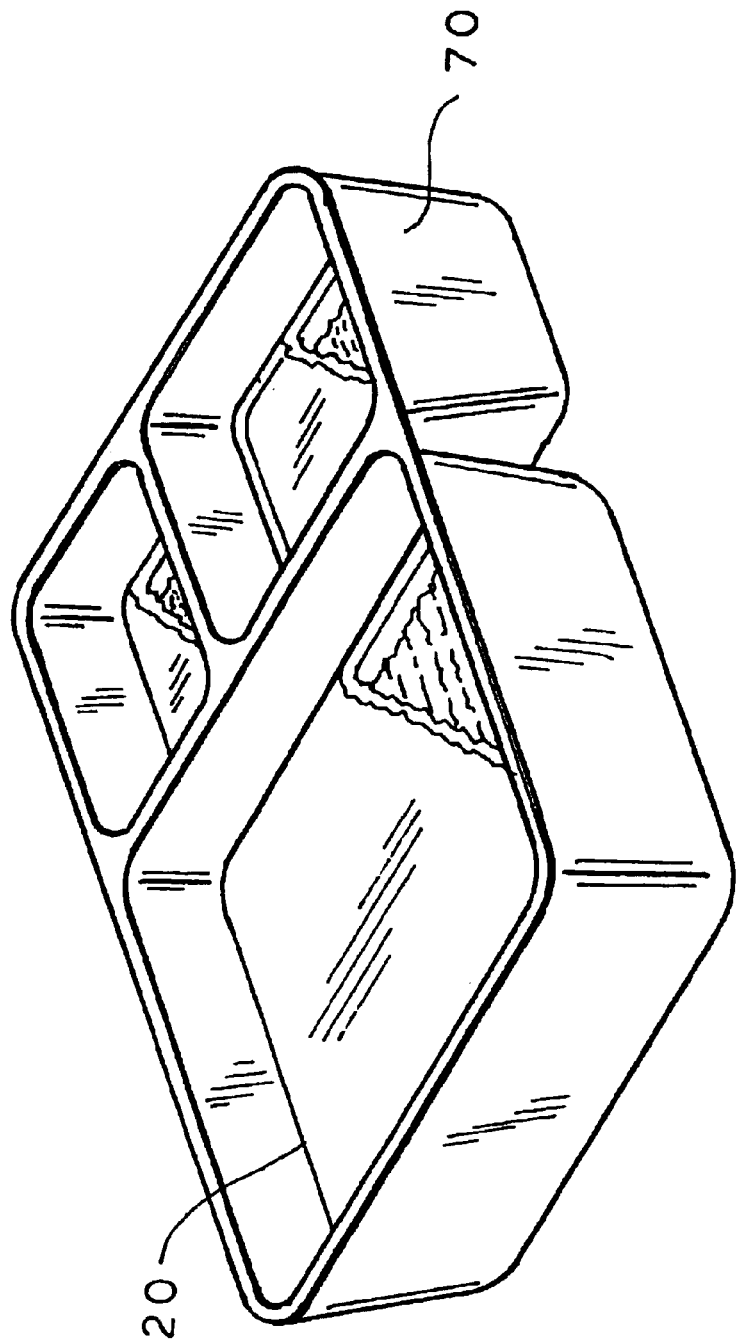

THERMAL PRESERVATION INSERT FOR FOOD STORAGE CONTAINER

BACKGROUND OF THE INVENTION AND DISCUSSION OF THE PRIOR ART

The present invention relates generally to freezer and warmer inserts and more particularly to freezer and warmer inserts for plastic food containers.

There are plastic food containers used for storing food sold on the market presently under well known brand names such as Tupperware, Ziplock and Glad. They come in a variety of specific sizes and shapes. They are designed to save space when storing food. There are also thin-walled versions of the same plastic food containers that are disposable. These plastic food containers are commonplace in kitchens. In addition, what makes the thinner version so useful is that each one is inexpensive and typically costs less than a dollar to purchase.

It is also well known to have thermally insulating "freezer packs" for cooling food placed adjacent or into food storage containers. "Freezer packs" are small plastic packages that contain a gel or a special liquid or fluid that stays cold for long period of time after being frozen in a freezer. They are typically used when transporting home made food for relatively long periods of time during travel, such as to school or office or on trips. Freezer packs can come in the form of plastic packages that are made of flexible plastic or of rigid plastic.

It is also known to have a material that is inside a flexible plastic container that can operate alternatively as a "freezer pack" and alternatively as a "hot pack" depending upon whether you put it in the freezer to become frozen of in the microwave oven to heat up. Such a product is sold by a company called Microban Products Company of Huntersville, N.C. under the name "Ice-Pak/Hot-Pak" and it carries inside it a gel having the name "Perma-Gel".

The problem is that freezer and warmer packs themselves are not specifically designed to fit into the plastic food containers in a way that saves space. That is, their shape does not conform precisely to the bottom of the well known sizes of plastic food containers or for that matter or any kind of plastic food container. Consequently, taking a food storage container and a freezer pack (or hot pack) and then placing the freezer pack into the plastic food containers partly defeats the whole purpose of the space saving containers. It uses up an unnecessarily large proportion of the space of the plastic food container since it does not fit neatly into the shape of the food container.

Families desiring to thermally preserve food during travel commonly do not place the freezer pack or hot pack inside the food storage container since that is considered unsanitary and an inefficient use of space. Instead, they use yet a third container, an additional container besides the food storage container and besides the hot pack or freezer pack in order to keep the hot or freezer pack adjacent the food. The third container is either a specially designed cooler that was purchased, which is expensive, or a hastily improvised bag into which both the food storage container and the hot or freezer pack are placed. Use of a bag or other improvised third container is not efficient thermal preserver since it involves keeping the hot pack or freezer pack adjacent a side of the food storage container. Furthermore, that which requires having to worry about an extra thing and often when people are arranging food storage for trips they are in a hurry and one less thing to worry about would be an advantage.

In addition, known ice pack or hot pack inserts into plastic food containers (unlike the plastic food container itself) have crevices or ridges on the surface such that if one were to insert these freezer or hot packs into a plastic food container containing soup or a solid food having liquid, the freezer or hot pack would acquire stains that would be hard to wash off. Since food stains are considered not clean insofar as a user would not want them to come into contact with food to be eaten, the known ice or hot pack inserts could not be easily re-usable. Alternatively, these freezer and warmer packs would require another divider between it and the actual food in the container, which would be a disadvantage. This demonstrates the need for a thermal preservation system for food that is simultaneously efficient in terms of space, is sanitary and is very inexpensive.

In addition, the plastic food containers that are commonly used at homes come in many different size specifically to deal with the different types and sizes of food being stored. It is also known to have plastic food containers that are divided across the width of the container into various compartments, as seen in FIG. 6. What is needed is freezer and hot insert packs that are uniquely suited for the sizes and shapes of the plastic food containers that are commonly found everywhere and that fit into the containers in a space saving way. That would make them consistent with the space saving functions of the plastic food containers. Furthermore, there is a need to have such freezer or hot inserts that can be used for different types of foods simultaneously. For example, many prepared meals contain a variety of types of foods (grilled chicken, pasta salad, french toast and bacon, jello) each of which have different thermal preservation requirements.

In addition, if plastic freezer packs are to be placed in direct contact with food they must be easy to clean. The flexible freezer packs acquire nooks and crannies because of their inherent manufacture and because they are easily folded. These nooks and crannies accumulate food stains that would be hard to remove. Hard packs also have many grooves, ridges and other protrusions on their upper and lower surfaces and this lack of smoothness prevents the consumer from cleaning them completely. It should be noted that food stains make something not clean. In addition, with respect to known freezer packs whether they are soft or made of rigid plastic, they are not designed to conform to a bottom of commonly used plastic food containers.

Most compartmentalized plastic food containers are simply divided horizontally rather than vertically. If the amount of food in the compartment is small compared to the height of the compartment then a large part of the compartment is wasted. Consequently, there is also a need to have compartments of plastic food containers that are on more than one vertical level within a container.

Finally, there is a need to have a non-toxic material as the thermal preservation fluid if only because people do not want anything toxic near their food and also because children can gain access to the inserts.

The thermal preservation insert of the present invention is a space saving insert designed to be used in combination with space saving plastic food containers. It is not only efficient in terms of space but it is sanitary, safe and very inexpensive to make and use. In sum, the inserts of the present invention achieve all of the above objectives and have additional advantages.

IMPORTANT OBJECTS AND ADVANTAGES

The following important objects and advantages of the present invention are:

(1) to provide an insert for plastic food containers that keeps food cool and that conforms to the shape of the bottom of a plastic food container;

(2) to provide an insert for plastic food containers containing a non-toxic freezing material, a non-toxic warming material and/or a non-toxic material that can be frozen or heated;

(3) to provide a thermal preservation insert for plastic food containers that is specifically designed to fit into the known sizes and shaped of the most popular low cost plastic food containers;

(4) to provide a thermal preservation insert that fits neatly into and conforms to the bottom of plastic food containers;

(5) to provide a thermal preservation insert that can rest on and lodge in a level position on the sloping walls of a plastic food container;

(6) to provide a thermal preservation insert for plastic food containers that can be stored conveniently in the freezer or other kitchen compartment;

(7) to provide thermal preservation inserts for plastic food containers that keep certain foods in the container cool and other foods located in the same container warm or extra cool and that simultaneously vertically divide the container into compartments for different kinds of food;

(8) to provide a convenient thermal preservation insert for plastic food containers that divides the container into a hot compartment and a cold compartment while maximizing the space saving features of the container;

(9) to provide a thermal preservation insert for plastic food containers that fits into the entire surface area of the bottom of the most popular plastic food containers thereby saving space for the space-saving plastic food containers;

(10) to provide a thermal preservation insert for plastic food containers that can fit both on the bottom of the plastic food container and can rest on the sloping walls of the container thereby dividing the containers into compartments;

(11) to provide a thermal preservation insert for plastic food containers that is a flat disk; and

(12) to provide a flat disk for cooling and warming foods in plastic food containers wherein the disk itself is smooth enough that it can be easily washed off from contact with liquid or solid foods;

(13) to provide an insert that can be either a freezer insert, a warmer insert or a freezer/warmer insert;

(14) to provide a thermal preservation insert that can be placed in the same plastic food container with the food and to do so in a way that minimizes the space used by said materials;

(15) to provide a thermal preservation insert for plastic food containers that is sanitary to use;

(16) to provide a thermal preservation insert for plastic food containers that is very inexpensive to manufacture and to use;

(17) to provide a thermal preservation insert that can rest on a ridge along an intermediate portion of the walls of the plastic food container; and

(18) to provide a thermal preservation insert that achieves maximal space-saving efficiency.

BRIEF DESCRIPTION OF THE DRAWINGS

FIG. 4A is a sectional view of the insert device of the present invention resting against the sloping walls of the plastic container;

FIG. 5 is an exploded perspective view of an annular embodiment of the insert device of the present invention; and FIG. 6 is a perspective view of the insert device of the present invention resting on the bottom of each compartment of a multi-compartment plastic food container.

DETAILED DESCRIPTION OF THE DRAWINGS AND PREFERRED EMBODIMENT

Figure 1:
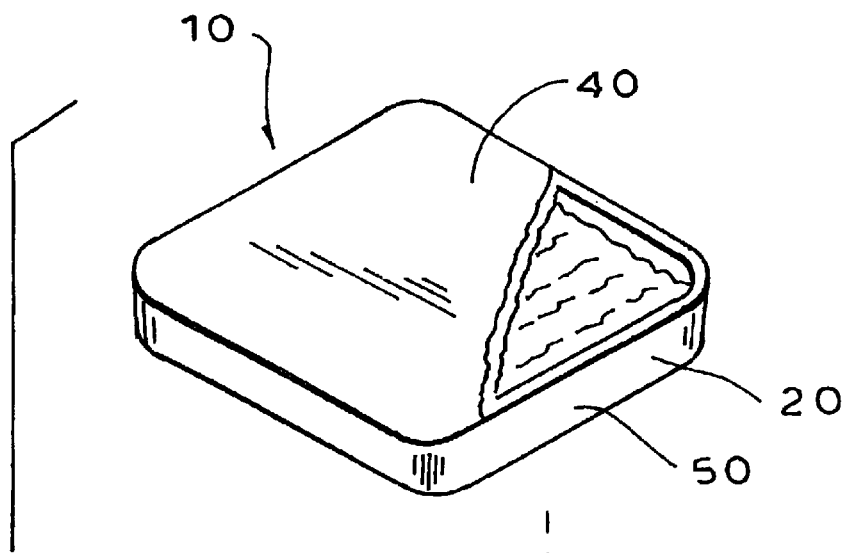
FIG. 1 is an exploded perspective view of the insert device of the present invention.
Figure 1:
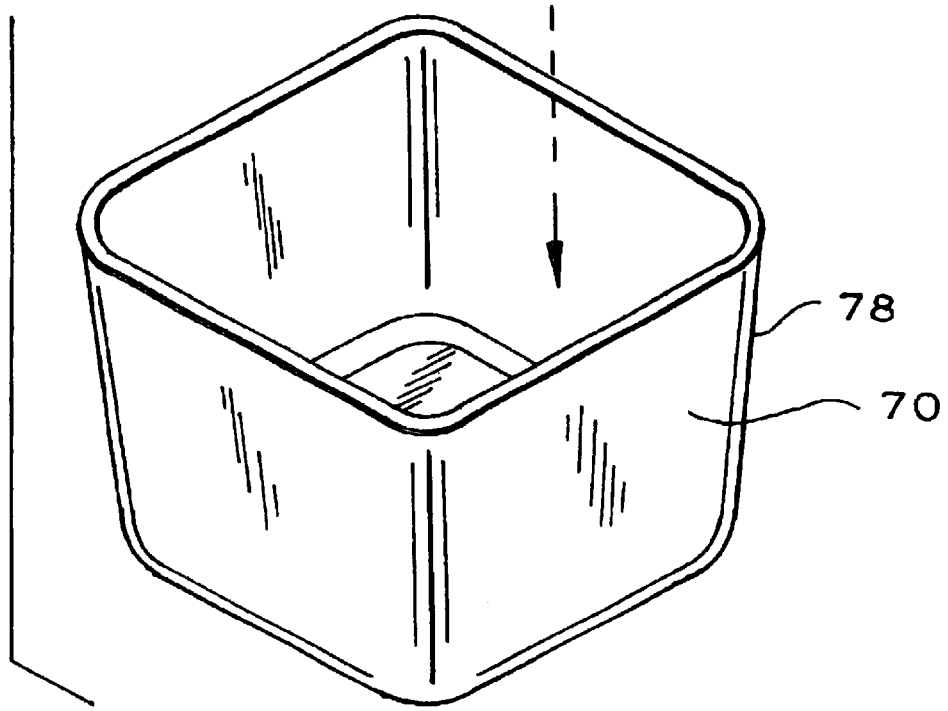
Figure 2:
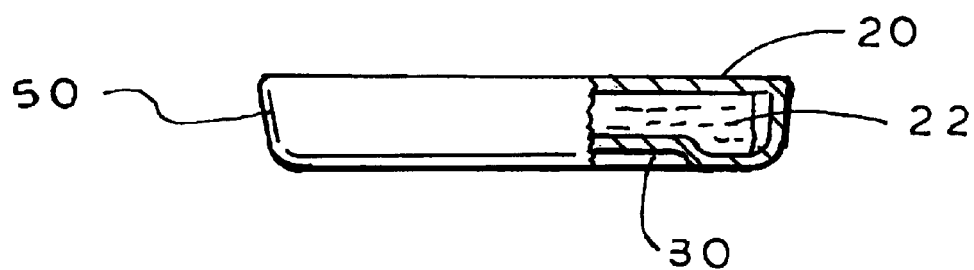
FIG. 2 is a side view of the insert device of the present invention partly broken away.
Figure 3:
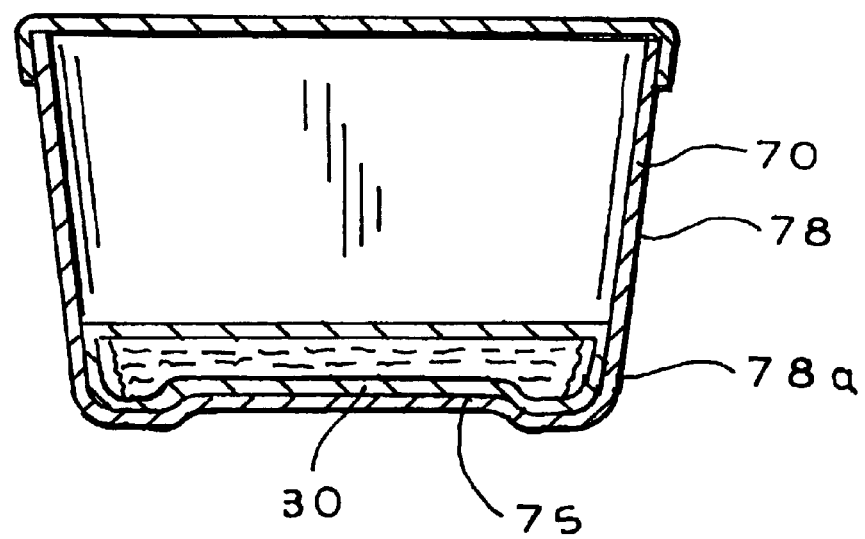
FIG. 3 is a sectional view of the insert device of the present invention resting on the bottom of and inside a plastic container.

In order to better understand the present invention in conjunction with the drawings of FIGS. 1–6, the freezer insert device of the present invention is assigned reference numeral 10 and its elements are described and assigned the reference numerals identified below.

The device 10 of the present invention in its simplest form is a freezer insert 10 or a warmer insert 10 or a freezer/warmer insert 10 for insertion into a plastic food container 70. The difference between the freezer insert 10, the warmer insert 10 and the freezer/warmer insert 10 is simply the type of fluid inside disk 20 with some fluids being usable only as a coolant, some usable only for heating or warming and some fluids usable as both either a freezer or a heater material depending on whether the insert is placed in a freezer or a microwave oven. In all three cases the structure of the device 10 is the same. For simplicity the below detailed description will often refer to a freezer insert but it should be understood that the device of the present invention applies equally to a warmer insert 10 and to a freezer/warmer insert 10. In this patent application the term "thermal preservation insert" shall mean the set of items comprising a freezer insert, a warmer insert and a freezer/warmer insert of the present invention. In this patent application, the term "thermal preservation fluid" shall mean a freezable coolant, a substance that can be heated as used as a warmer and a substance that can be either frozen or heated at the user's option.

The plastic food container 70 into which freezer insert 10 is designed to be placed includes a bottom 75 and a container wall 78, with the container wall 78 having a lower portion 78a that meets the bottom 75. The size of the plastic food container 70 would vary and the shape would vary—some being round, others square, etc. But the sizes and shapes are specific known shapes and sizes sold by the companies that sell the most popular of these plastic food containers. The present invention may be used in plastic food containers that are made of thick plastic and are particularly useful in conjunction with the plastic food containers that are relatively thin and are often disposed of.

The freezer insert 10 of the present invention can be placed into one of two positions in the plastic food container 70. The first position is at the bottom of the plastic food container 70 and the second position is in the middle of the plastic food container 70. In this way, the plastic food container 70 can be divided into two vertical compartments with each of the compartments being usable for a different type of food.

Thermal preservation insert 10 in its simplest form is intended to rest on the bottom 75 of the plastic food container 70. Thermal preservation insert 10 comprises a disk 20 that is substantially flat on its upper surface, which disk 20 contains a freezable or heatable fluid, gel or coolant 22 that is completely buried inside the disk 20. That is, the coolant or other fluid is completely surrounded by the surfaces of the disk 20 so that it cannot leak out The gel or fluid inside disk 20 is not typically water but is made of a substance that remains frozen or hot, as the case may be, longer than ice remains frozen and longer than hot water remains hot. Another requirement of fluid 22 is that it is non-toxic and unable to corrode through or leak through rigid plastic in light of the fact there will be food adjacent disk 20 even taking into consideration the fact that fluid 22 is completely enclosed by disk 20. It is known to have such non-toxic and non-corrosive fluids 22. It should be noted that the gel or other liquid or fluid inside the disk 20 can be of the variety that can alternately be made to freeze when placed inside a freezer or at the user's option be made to become hot when placed inside a microwave oven. As explained before, Microban Products company sells such an "Ice-Pak/Hot-Pak" product containing "Perma'Gel", a non-toxic material. The non-toxic material inside the Microban product would be used but the surrounding container would not be a flexible plastic but would be a rigid disk as described in the present invention having the shape and other features of the present invention.

Accordingly, and as further explained below, use of multiple thermal preservation inserts 10 of the present invention allows division of the plastic food container 70 into thermally distinct compartments, such as a cool section and a very cool section or even, for limited periods of time, into a cool section and a warm section.

Disk 20 is made of sufficiently rigid plastic so that the plastic maintains its shape when weight is placed on it so that it achieves its space-saving function and remains sanitary. An additional reason why disk 20 must be made of sufficiently rigid plastic is to prevent even the possibility of leakage of the fluid 22 into or near food in food container 70. "Sufficiently rigid", however, does not mean that it cannot have any flexibility. It need only be sufficiently rigid to maintain it shape and prevent leakage.

Disk 20 has a lower surface 30 that conforms to the shape of the bottom 75 of the plastic food container 70. Disk 20 is able to conform to the shape of the bottom 75 of the plastic food container 70 because plastic food containers are so commonly sold under the brand names Tupperware, Ziplock and Glad that so many households have these containers. Accordingly, the product line of these plastic food containers can be examiner and measured and the various sized disks 20 of various sized freezer inserts 10 can be made to conform to the bottoms 75 of each size and shape of plastic food container sold under each of these three brand names. The present invention is not limited to these brands but as a practical matter one would not want to make freezer inserts 10 that fit every single size and type of plastic food container since they are too numerous.

Typically, disk 20 has a substantially flat upper surface 40. The disk has a side 50 that conforms to a shape of the lower portion 78a of the container wall 78 of the plastic food container 70.

The term "container wall" as used herein contemplates both a annular wall in the event that the food container 70 is substantially cylinder, as seen in FIG. 5, and contemplates a plurality of wall sections in the event that the container 70 is not shaped as a cylinder but has corners dividing the container wall into wall sections, such as where the container 70 has a polygonal cross-section, as seen in FIGS. 1 and 6.

Upper surface 40 of disk 20 is not only substantially flat but also substantially smooth for sanitary reasons so that food stains do not accumulate during re-use. Alternatively, the upper surface 40 of the disk 20 can have a pattern of protrusions (not shown) that are the inverse shape of the lower surface 30 of the disk 20, the purpose being that one freezer insert 10 would be able to nest onto another freezer insert 10 for space-saving purposes when stacking the freezer inserts 10 in the freezer. The protrusions would still be regular enough so that upper surface 40 of disk 20 can be easily cleaned. Thus upper surface 40 of disk 20 conforms to a shape of the lower surface 30 of an identical disk 20.

In addition, as best seen in FIG. 4a, the thermal preservation insert 10 also has the option of resting in the middle of the height of the plastic food container 70. This only applies where the plastic food container 70 has a sloping wall which is the case with most of the popular brands of plastic food containers. In that case, the plastic food container 70 includes a bottom 75, a sloping container wall 178 and an interior space surrounded by and defined by the sloping container wall 178 narrowing toward the bottom 75. The plastic food container 70 has a lower portion 178a of sloping container wall 178 that meets the bottom 75. The thermal preservation insert 10 is the same flat disk 20 containing freezable or heatable fluid or material 22 completely buried inside the disk 20 and flat disk 20 has a lower surface 30 that conforms to the shape of the bottom 75 of the plastic food container 70, a substantially flat and preferably smooth upper surface 40, and a side 50 that conforms to the lower portion 178a of the sloping container wall 178 of the plastic food container 70. The flat disk 20 is capable of being inserted into the plastic food container 70 so as to rest on an intermediate portion of sloping container wall 178 of the plastic food container 70 or on the bottom 75 of the container 70. This does not refer to the same flat disk but rather to two different disks. As seen from FIG. 4A, the second disk is identical to the first except that it has a slightly larger diameter than the first disk and that the side 50 of the second disk conforms to the intermediate portion of the sloping container wall 178 rather than to the lower portion 178a of the sloping container wall 178. Thus, the second disk is capable of resting on the intermediate portion of the sloping container wall 178.

As explained, disk 20 can be placed in two positions. For example, the insert disk 20 sitting on the bottom 75 of plastic container 70 could contain freezing fluid 22 and the insert disk 20 resting on an intermediate portion of the sloping walls 178 of the plastic container 70 could contain freezing fluid thus making the food located between the two inserts 10 very cool while the food resting on the top insert just cool. Alternatively, a warm compartment could be designed if, for example, the material inside the Microban Ice-Pak/Hot-Pak were covered with a thin rigid plastic covering and the disk 20 were heated in the microwave and placed in the intermediate position in the middle of the plastic container 70. A second freezer insert using the same material (or an insert 10 with ordinary freezable fluid 22) would be frozen in the freezer and placed in the bottom of the plastic food container 70. The insert disk 20 sitting on the bottom 75 of plastic container 70 would contain heated fluid or material 22 and the insert disk 20 resting on an intermediate portion of the sloping walls 178 of the plastic container 70 would contain freezing fluid 22 thus making the food lodged between the two inserts 10 cool while the food resting on the top insert warm. Obviously, a cool and warm compartment could not co-exist forever in the same container but it could co-exist temporarily which may be all that is needed for the one hour trip that is planned.

Any combination of thermal preservation functions that is practical for division of food types can be used. Accordingly, freezer insert 10 creates two thermally distinct and vertically separate compartments in the plastic food container 70. Food that has to be kept very cool would be located between the two disks 20 and the food that needs to be cool but not as cool would be located between the upper disk 20 resting on the sloping container walls 178 and the lid at the top of the plastic food container 70. As an example, pasta salad may need to be very cool while Greek salad may need to be just cool. Another example would be where blintzes and sour cream can be stored in one container—the blintzes can be stored in the warm compartment and the sour cream in the cool compartment.

Alternatively, as shown in FIG. 6, the insert 10 of the present invention can be in combination with a multi-compartment plastic food container 70 wherein each compartment of the multi-compartment container 70 includes a bottom and a compartment container wall, the compartment container wall having a lower portion that meets the bottom. Resting on the bottom of each compartment is a disk 10 of the present invention having the structure of the disks 10 previously described (i.e. shaped to conform to the bottom of the compartment and to the lower portion of the compartment container wall).

Plastic food container 70 is not so rigid that its outer wall 78 (or 178) cannot be bent. Accordingly, after the user removes the food from the top compartment and wants to gain access to the lower compartment, the user need only squeeze the container 70 or push down on one corner of disk 20 located in the intermediate position. Alternatively, the user can grasp plastic tab 87 that forms part of disk 20, as seen in FIG. 5. Tab 87 can be solid or form a loop. Since tab 87 is flexible and juts out from upper surface 40 near or adjacent to side 50, it does not interfere with stacking of the inserts 10. Tab 87 is smooth to maintain cleanliness. The user could use the version of insert 10 with tab 87 for the insert 10 that is placed in the middle of container 70 and, if desired, also for the insert 10 that conforms to bottom 75 of container 70.

Figure 4B:
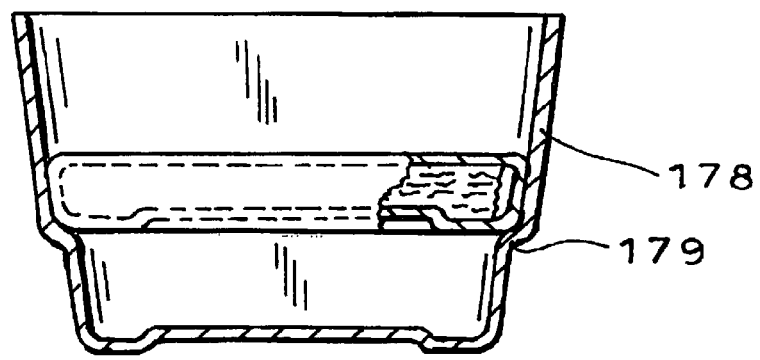
FIG. 4B is a sectional view of the insert device resting on a ridge located in an intermediate position along the walls of a plastic container.

Some plastic containers 70 have a ridge 179 at an intermediate portion of the sloping wall 178 of container 70. FIG. 4B depicts the insert device 10 of the present invention resting on ridge 179 inherent in wall 178 of plastic container 70. The insert 10 is the same as described for a container 70 without ridge 79 except that the width of the insert 10 needs to conform exactly to the width of the container 70 at the height of the ridge 179. Wall 78 of container 70 need not be a sloping wall (although it could be) in order for there to be ridge 79 in an intermediate portion thereof.

In general, the present invention can also be thought of as a combination of the freezer insert and the plastic food container. The plastic food container has a bottom and a sloping container wall, an interior space defined by the sloping container wall narrowing toward the bottom with the plastic food container having a lower portion that meets the bottom. The freezer insert comprises a disk, the disk containing a freezable coolant or warming fluid completely buried inside the disk, the disk having a lower surface 30 that conforms to a shape of the bottom 75 of the plastic food container, and having a side that conforms to the lower portion 178a of the sloping container wall 178 of the plastic food container 70. The flat disk 20 is capable of being inserted into the plastic food container so as to rest on an intermediate portion of sloping container wall of the plastic food container or on the bottom of the container 70.

As before, the disk would have a substantially flat upper surface 40 or, if need be for stacking and nesting purposes, the upper surface 40 of the disk 20 would have protrusions (not shown) inverse to the lower surface of the disk 20.

Use of the freezer insert 10 or freezer/warmer insert 10 or warmer insert 10 allows the user to use food preserving materials in the same plastic food container with the food and to do so in a way that minimizes the space used by these materials. The device 10 of the present invention would also be very inexpensive both to manufacture and purchase due to its simplicity and the very low cost of the gel packs currently sold.

As used herein, the term "disk" is used in a special way as described in the Specification and illustrated in the drawings. Thus, "disk" 20 need not be round.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A combination of a thermal preservation insert and a plastic food container, comprising:
   a plastic food container including a bottom with a periphery and a container wall, said container wall having a tapered lower portion with an inner surface that meets the periphery of the bottom, the inner surface having a shape, the tapered lowered portion being tapered around its entire inner surface,
   a thermal preservation insert comprising:
   a disk, the disk containing a thermal preservation fluid completely buried inside the disk,
   the disk having a lower surface that conforms identically to the periphery of the bottom of the plastic food container and having a tapered side that conforms identically to the shape of the inner surface of the lower portion of the container wall of the plastic food container, the lower surface of the disk resting on the bottom of the plastic food container and the side of the disk resting snugly against the lower portion of the container wall, said disk not fastened to a part of the plastic container.

2. The combination of claim 1, wherein the disk has a substantially flat upper surface.

3. The combination of claim 1, wherein the upper surface of the disk has a plastic tab jutting out.

4. The combination of claim 1, wherein the upper surface of the disk is substantially smooth.

5. The combination of claim 1, wherein the thermal preservation fluid is inaccessible.

6. The combination of claim 2, wherein the thermal preservation fluid is inaccessible.

7. A method of preparing a plastic food container so that it can store food in a thermally controlled way, comprising:
   (a) providing a plastic food container, said plastic food container including a bottom with a periphery and a container wall, said plastic food container wall having a tapered lower portion with an inner surface that meets the periphery of the bottom, the inner surface having a shape, the tapered lowered portion being tapered around its entire inner surface, (b) providing a thermal preservation insert, the insert comprising:
  a disk, the disk containing a thermal preservation fluid completely buried inside the disk, the disk having a lower surface that conforms identically to the periphery of the bottom of the plastic food container and having a tapered side that conforms identically to the shape of the inner surface of the lower portion of the container wall of the plastic food container (c) placing the thermal preservation insert inside the plastic food container so that the lower surface of the disk rests on the bottom of the plastic food container, so that the side of the disk rests snugly against the lower portion of the container wall and so that the disk is not fastened to a part of the plastic food container.

* * * * *